Dec. 16, 1941.                M. K. SHIPMAN                 2,266,089
                          STAGE AND DISPLAY DEVICE
                           Filed Aug. 28, 1939
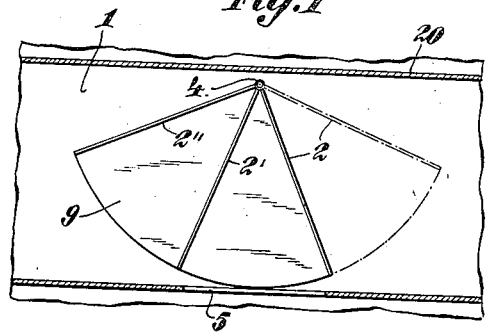
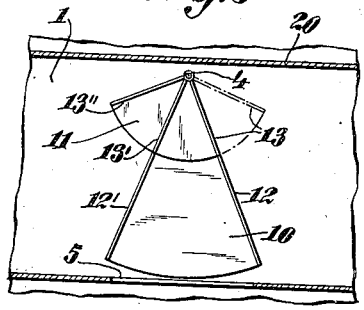
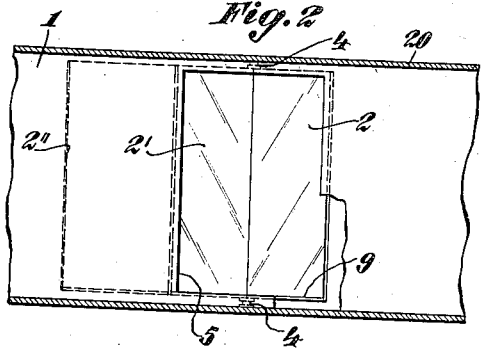
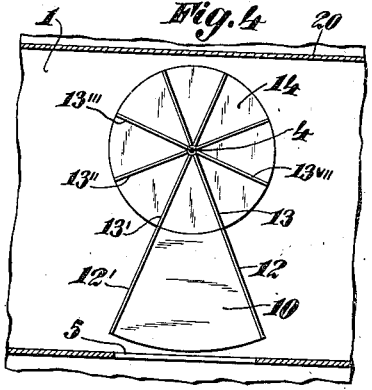
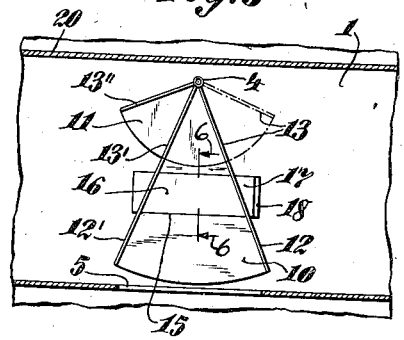
INVENTOR.
Mildred Knapp Shipman,
BY Alexander Chessen
her ATTORNEY.

Patented Dec. 16, 1941

2,266,089

UNITED STATES PATENT OFFICE 2,266,089

STAGE AND DISPLAY DEVICE

Mildred Knapp Shipman, San Francisco, Calif.

Application August 28, 1939, Serial No. 292,232
In Australia November 10, 1938

7 Claims. (Cl. 272—13)

My invention is concerned with stage and display effects produced by mirrors and, more particularly, with devices of this nature in which the matter presented to the view of an observer can be promptly changed in substance or in the arrangement of details.

The main object of all devices of this class is to create the optical illusion of a kaleidoscopic multiplication of objects by reflection and re-reflection in the mirrors, as is disclosed in my Australian Patents Nos. 12,916, 13,092 and 13,216, all of 1908. One of the specific objects of the present invention is to diversify the kaleidoscopic effect by a sectional arrangement of the device, only one of the sections being exposed to view, the other sections undergoing changes in the meantime, and bringing the several sections into view seriatim. Another object is to permit this diversification of effect without unduly increasing the space occupied by the device. A further object is to combine unchangeable features of the presentation in one part of the device with transient features in another part. Still another object is to produce novel effects by movable slides under a transparent portion of the flooring. Other objects will become apparent from the specification which follows and from the accompanying drawing.

In the drawing, Figure 1 is a plan view of a preferred embodiment of the invention. Figure 2 is a front elevation of the same embodiment. Figures 3, 4 and 5 are plan views of devices embodying certain modifications of the invention. Figure 6 is a detail, being a cross section of Figure 5 taken along the line 6—6.

Referring now to Figures 1 and 2, the horizontal platform 9 is a sector of a circle and rotatable about the vertical axis 4—4. The vertical mirrors 2, 2', 2'', on the platform 9 meet along the line 4—4 and are arranged to form two compartments of V-shaped cross section. There may, of course, be more than three mirrors and a correspondingly larger number of compartments, although only three mirrors are shown in the drawing for the purpose of illustration. Nor need the angles of the V's be the same for all the compartments. The axis 4—4, as shown, is close to the back wall 20 and may be in the wall itself. As is explained farther below, the proximity of the line 4—4 to the back wall 20 determines how much saving may be effected in the space required for the installation of the device. In the case where the angle of the V is the same for all of the compartments, denoting by $a$ the angle between the extreme possible positions of the mirrors, i. e., the angle between the mirror 2 when turned as far as possible contra-clockwise and the mirror 2'' when turned as far as possible clockwise, and by $n$ the number of compartments, the angle of the V must not exceed $$\frac{a}{2n-1}$$

At the same time, to obtain a uniform and symmetrical reflection throughout, the angle of the V must be a divisor of 360°. For example, if the axis 4—4 is in the wall 20 itself, the angle $a$ is equal to 180°. The angle of the V, therefore, must not exceed 60° for a two compartment set up. It may be exactly that, since 60 is a divisor of 360. If the number of compartments is 3, the angle of the V may be 180° divided by 5, i. e. 36°, which also is a divisor of 360°. Suppose, now, that the line 4—4 is away from the back wall to the short distance for which the angle $a$ is 200°. In this case, the angle of the V for a two compartment set up must not exceed 200° divided by 3, i. e., 66 and ⅔ degrees. The maximum angle of the V, therefore, again is 60°, this being the nearest number to 66 and ⅔ which is a divisor of 360°. For the same position of the axis 4—4, but a three compartment set up, the formula shows that the angle of the V must not exceed 200° divided by 5, or 40°, and this angle is acceptable because 40° is a divisor of 360°.

Naturally, the closer the line 4—4 is to the back wall 20, the less need the depth of the stage or enclosure 1 be. However, if it is desired to make a greater number of changes possible without requiring too much space, the arrangement shown in Figure 4 may be adopted. In this case, only a part of the horizontal platform, namely, the platform 14 is rotatable, but the mirrors can make a complete turn of 360 degrees, and the number of available compartments is much greater, eight being shown in Figure 4, formed by the eight mirrors 13, 13', 13'', ....., 13ᵛ''. The rest of the platform, 10, is stationary and preferably, although not necessarily, flush with the platform 14. Two vertical mirrors 12, 12', on the platform 10 are so angularly disposed that they form continuations of the mirrors 13, 13', when these are in the position shown, i. e., facing the frontal opening 5.

Of course, the same arrangement of mirrors as is shown in Figure 1 may be adopted for the case when only a portion of the platform is rotatable, such an arrangement being shown in Figure 3. While the latter arrangement saves nothing in depth, as compared with the arrangement shown in Figure 1, it saves lateral space and, in addition, permits to combine a non-changeable presentation (on platform 10) with a transient presentation (on platform 11).

In Figure 5, the device is similar to the one illustrated in Figure 3, the only difference being in the addition of a transparent section 16 in the platform 10, flush therewith, and of one or more slides (two such slides, 17 and 18, being shown in the drawing) movable under the section 16 and supported by slats 19.

Only a brief description of the operation of the device is necessary. It is to be understood that in all cases the requisite illumination is provided. Illuminating means are not shown because they constitute no part of the present invention, and it is assumed that standard methods are used.

The operation in the case of Figures 1, 2, will now be explained. To simplify the discussion, a compartment of and between two mirrors 2 and 2' will be denoted by the symbol (2, 2'); one between mirrors 2' and 2'' by (2', 2''), and so on. Before the mirrors assumed the position shown in Figure 1, the compartment (2', 2'') was facing the frontal opening 5, and an observer received the familiar optical illusion of a multiplication of whatever objects, stationary or moving, were arranged within this compartment. Then, for the period of but a few seconds, a curtain (not shown, this being a well understood detail) is drawn over the opening 5, the platform 9 is turned clockwise until the compartment (2', 2) faces the opening 5 (which is the position shown in the drawing), and the curtain is again drawn away from the opening 5. While the compartment (2', 2'') was facing the opening 5, the contents of the compartment (2', 2) were changed or rearranged, so that the observer sees an entirely new illusion made up of a new set up and of its reflections.

As was stated in describing Figure 1, the V angles of the two compartments need not be the same. The difference in the area of vision caused by the difference in the angles of the V's is properly taken care of by drawing the curtains closer or farther apart, so that in every case only one compartment is open to view. The mirrors 2, 2', 2'', etc., are, of course, double mirrors, i. e. both sides of each mirror are reflecting surfaces. As explained before, there may be more than two compartments. When, for instance, there are three, changes may be effected in two of them while the third one is open to view. Thus, by swinging the platform 9 back and forth, a continually changing presentation is produced, the compartments which are not in view undergoing changes while only one of the compartments remains in sight of the observer.

The preceding discussion obviously applies also to Fig. 3, the only difference being that various changeable presentations are combined with a non-changeable presentation arranged on the stationary platform 10.

As to Fig. 4, here the number of presentations subject to possible changes is much greater. Specifically, in Fig. 4, there are eight compartments of 45° each (a larger number of compartments is, of course, possible, but usually an angle of less than 45° is not practical). In this type of the invention, differentiation is relied upon the fact that there are numerous different presentations available without the necessity of changing the contents of any one of the compartments.

Coming now to the last illustration, Figs. 5 and 6, the operation is similar to the one described in connection with Fig. 3, with the following addition: by moving colored or variegated slides, such as slides 17, 18, under the transparent section 16 of the platform 10, back and forth, in opposite directions, various illusions are created, such, for instance, as a rippling brook. A human figure dancing on top of the section 16 would thus appear to be dancing on the surface of water. The slides, obviously, could be operated equally well under a transparent section of the rotatable platform 11.

Many other variations within the scope of the invention will readily suggest themselves to those skilled in the art, and it is to be understood that the embodiments described here are intended only as illustrations and examples.

I claim:

1. In a stage or display device, an enclosure having a frontal opening and a back wall, a horizontal platform within said enclosure, and a plurality of mirrors on said platform meeting along a vertical line disposed close to said back wall and forming compartments of V-shaped cross section in a portion of the angular space available about said vertical line within said enclosure, said platform and mirrors being jointly rotatable about said vertical line, whereby at least one of said compartments may be moved into the remaining portion of said angular space, and said frontal opening giving a full view of one of said compartments only.

2. In a stage or display device, an enclosure having a frontal opening and a back wall, a horizontal platform within said enclosure, and a plurality of mirrors on said platform meeting along a vetrical line disposed close to said back wall and forming compartments of the same V-shaped cross section in a portion of the angular space available about said vertical line within said enclosure, said platform and mirrors being jointly rotatable about said vertical line, whereby at least one of said compartments may be moved into the remaining portion of said angular space, and said frontal opening giving a full view of one of said compartments only.

3. In a stage or display device, an enclosure having a frontal opening and a back wall, a horizontal platform within said enclosure, a plurality of mirrors on said platform meeting along a vertical line disposed close to said back wall and forming compartments of the same V-shaped cross section in a portion of the angular space available about said vertical line within said enclosure, said platform and mirrors being jointly rotatable about said vertical line, whereby at least one of said compartments may be moved into the remaining portion of said angular space, a stationary horizontal platform within said enclosure forming an extension of said rotatable platform, and two stationary vertical mirrors angularly disposed on said extension platform to be flush with and form continuations of the mirrors of any one of said compartments when in position facing said frontal opening.

4. In a stage or display device, an enclosure having a frontal opening and a back wall, a horizontal platform within said enclosure, and a plurality of mirrors on said platform meeting along a vertical line disposed close to said back wall and forming compartments of the same V-shaped cross section in a portion of the angular space available about said vertical line within said enclosure, said platform and mirrors being jointly rotatable about said vertical line, whereby at least one of said compartments may be moved into the remaining portion of said angular space, said frontal opening giving a full view of one of said compartments only, and the angle of said V-shaped cross section being a divisor of 360° but not exceeding $$\frac{\alpha}{2n-1}$$

where $\alpha$ is the angle between the extreme possible positions of said mirrors and $n$ is the number of said compartments.

5. In a stage or display device, an enclosure having a frontal opening and a back wall, a horizontal platform within said enclosure, a plurality of mirrors on said platform meeting along a vertical line disposed close to said back wall and forming compartments of the same V-shaped cross section in a portion of the angular space available about said vertical line within said enclosure, said platform and mirrors being jointly rotatable about said vertical line, whereby at least one of said compartments may be moved into the remaining portion of said angular space, the angle of said V-shaped cross section being a divisor of 360° but not exceeding $$\frac{\alpha}{2n-1}$$

where $\alpha$ is the angle between the extreme possible positions of said mirrors and $n$ is the number of said compartments, a stationary horizontal platform within said enclosure forming an extension of said rotatable platform and flush therewith, and two stationary vertical mirrors angularly disposed on said extension platform to be flush with and form continuations of the mirrors of any one of said compartments when in position facing said frontal opening.

6. In a stage or display device, an enclosure having a frontal opening, a horizontal platform within said enclosure, a plurality of mirrors on said platform meeting along a vertical line and forming compartments of the same V-shaped cross section in a portion of the angular space available about said vertical line within said enclosure, said platform and mirrors being jointly rotatable about said vertical line, whereby at least one of said compartments may be moved into the remaining portion of said angular space, a stationary horizontal platform within said enclosure forming an extension of said rotatable platform, two stationary vertical mirrors angularly disposed on said stationary platform to be flush with and form continuations of the mirrors of any one of said compartments when in position facing said frontal opening, a transparent section in and flush with said stationary platform, and a movable slide under said transparent section.

7. In a stage or display device, an enclosure having a frontal opening, a horizontal platform within said enclosure, a plurality of mirrors on said platform meeting along a vertical line and forming compartments of the same V-shaped cross section in a portion of the angular space available about said vertical line within said enclosure, said platform and mirrors being jointly rotatable about said vertical line, whereby at least one of said compartments may be moved into the remaining portion of said angular space, a stationary horizontal platform within said enclosure flush with said rotatable platform, said two platforms forming a continuous flooring, two stationary vertical mirrors angularly disposed on said stationary platform to be flush with and form continuations of the mirrors of any one of said compartments when in position facing said frontal opening, a transparent section in said flooring flush therewith, and a movable slide under said transparent section.

MILDRED KNAPP SHIPMAN.